United States Patent Office 3,038,732
            Patented June 12, 1962

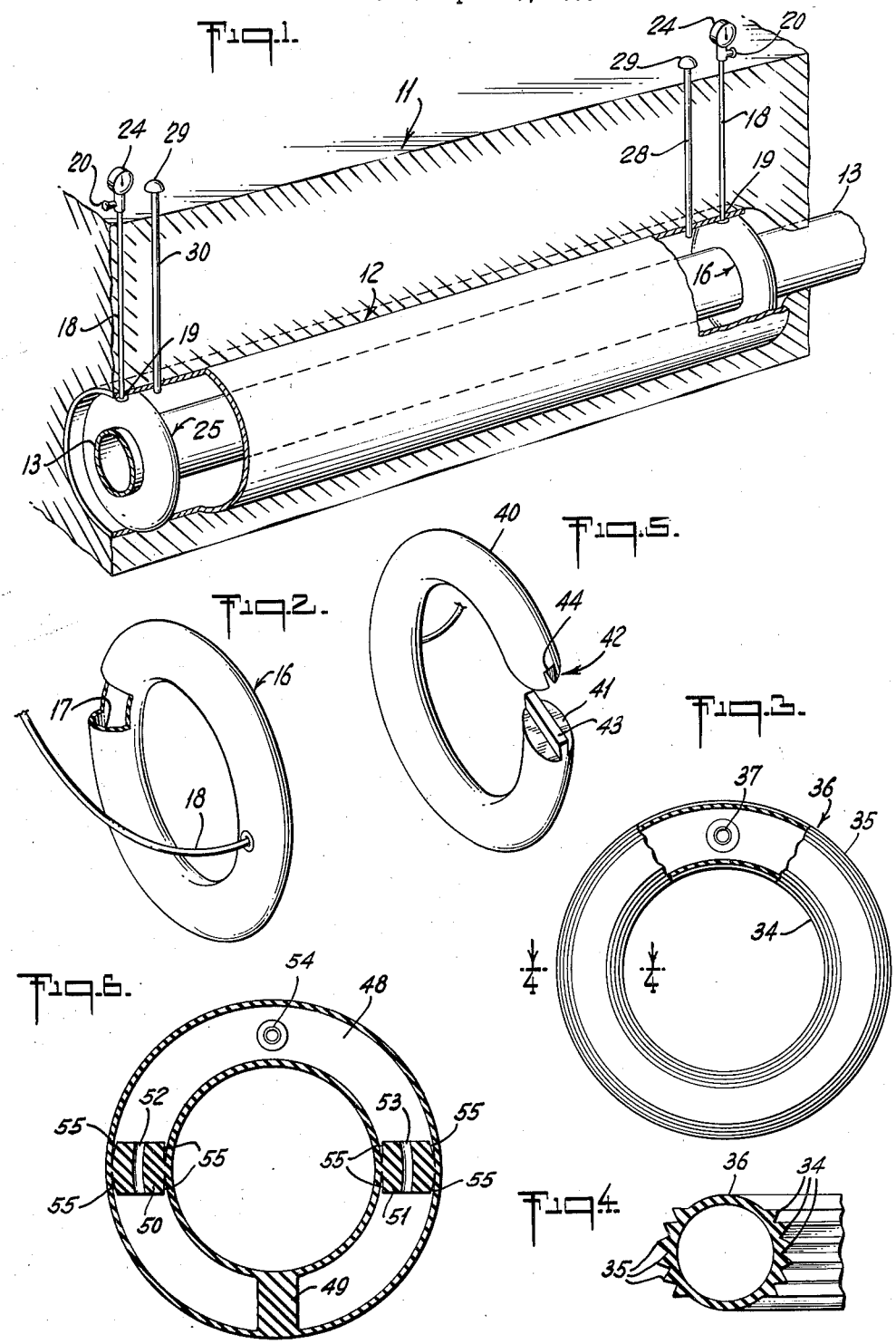

3,038,732
INFLATABLE SEAL BUSHING FOR PIPELINE CASING
John R. Scott, Midland, and Donald H. Bond, Houston, Tex., assignors to The Texas Pipe Line Company, Houston, Tex., a corporation of Texas
Filed Apr. 7, 1958, Ser. No. 726,800
4 Claims. (Cl. 277—34)

This invention concerns pipeline casing seals in general, and more specifically deals with such seals that are inflatable in nature.

Formerly, in cases where a pipeline passed under a roadway or the like and a protective casing was employed surrounding the pipe under the roadway, various arrangements were employed for making the casing watertight at the open ends thereof. For example, use has been made of wrapped rubber sheet material. Also, sometimes a molded seal was employed. Such a molded seal covered the outside of the casing and tapered down onto the outside of the pipe closeby. In either of these former methods of providing a seal at the open end of a pipeline casing, there has been room for improvement in ability to provide a water-tight seal. Furthermore, the application of such former types of seals to the ends of a casing, was relatively cumbersome and slow.

Consequently, it is an object of this invention to provide a seal for pipeline casing having improved qualities and being more effective in keeping water out of the annulus between the inner walls of the casing and the outside of the pipe. Such casing seals are most often employed where a pipeline passes underneath a roadway or the like, and where a casing is employed to protect the pipeline at this point.

Another object of this invention is to provide inflatable seals for use at the ends of a pipeline casing, in order to make a water-tight seal for keeping the interior of the casing dry.

Another object of the invention is to provide inflatable type seals for use with pipeline casings, wherein there is provided a valve for inflating the inflatable seal that is located at the surface for easy access. In addition, it is contemplated that there may be provided a pressure gauge to determine, by quick inspection, the degree of inflation that exists at any time.

Briefly, this invention concerns an inflatable seal bushing for sealing a pipeline casing. This bushing comprises a hollow resilient means having an inflated configuration to match the inside surface of the casing, and the outside surface of that portion of the pipeline which passes through the casing. The bushing also comprises means for introducing a fluid into said hollow resilient means in order to inflate the same.

Again briefly, the invention concerns pipeline protection that employs a casing surrounding a given length of the pipe of the pipeline where it passes under the earth's surface. The elements of such pipeline protection include inflatable seals at the ends of said casing, to keep out water. The said seals each have an elongated tube extending from the seal to the surface adjacent thereto. The said casing has a vent that extends from the interior of the casing to the surface, to allow any gas leakage into the annulus surrounding said pipeline, to escape.

The above and other objects and benefits of the invention will be more fully appreciated in connection with a more detailed description which follows, and which is illustrated in the drawings, in which:

FIG. 1 is a perspective, partially broken away in section, illustrating a casing and that portion of a pipeline which passes therethrough;

FIG. 2 is an enlarged perspective, partially broken away to show the interior construction, illustrating one of the seals employed with the casing and pipe;

FIG. 3 is an enlarged elevation, partially broken away in section, illustrating another embodiment of a seal for use with the casing;

FIG. 4 is a further enlarged cross section view, taken along the lines 4—4 of FIG. 3 looking in the direction of the arrows.

FIG. 5 is an enlarged perspective illustrating another embodiment of a seal according to this invention; and FIG. 6 is an enlarged longitudinal cross section view, illustrating still aonther embodiment of a seal in accordance with the invention.

Referring to FIGS. 1 and 2, it will be observed that there is illustrated a roadway, or the like, 11 under which the pipeline passes at the desired depth beneath the surface of the roadway. There is a casing 12 which passes transversely beneath the roadway 11. This casing 12 is employed for protection of that portion of a pipeline 13 which passes beneath the roadway 11. The casing 12 may be constructed of any feasible material having sufficient strength to withstand the loads thereon, that exist by reason of the surrounding formation, as well as the additional loads applied by the passage of any vehicle thereover, e.g. along roadway 11. In addition the casing 12 is constructed of an impervious material, in order to prevent the seepage of water into the annular space between the casing 12 and the pipe 13 passing therethrough. Thus, casing 12 will ordinarily be a steel pipe.

At either end of the casing 12 there is located an inflatable seal in accordance with this invention. In the modification illustrated in FIGS. 1 and 2, this seal takes the form of a resilient material torous ring 16, which may be made of any feasible material having sufficient resiliency, e.g. rubber or neoprene or the like. As indicated in FIG. 2, this torous ring 16 is hollow and has a circular cross section with the side walls 17 thereof having sufficient thickness to withstand the required pressures for obtaining a satisfactory seal. In addition, the ring 16 has a tube 18 connected thereto through the side walls 17 of the ring. The tube 18 is attached in an air-tight manner for holding pressure in the ring. As the ring 16 is mounted, at one end of the casing 12, tube 18 passes through a hole 19 in the casing 12. Hole 19 is preferably near the top of the casing 12, to provide the shortest distance to the surface, near the roadway 11.

Above the surface of the ground, near the roadway, the free end of tube 18 extends upward sufficiently to allow free access to a valve 20, for use in inflating the ring 16 and maintaining pressure therein. This valve 20 may take a conventional form and no further description thereof need be given here. Also connected to the tube 18 on the pressure side of valve 20, there is a gauge 24 for indicating the amount of pressure that exists in the ring 16.

Now it will be observed that there is provided a simple yet effective seal bushing, for preventing the entrance of water at the open end of the casing 12. Furthermore, there is an added convenience in having the inflation tube 18 extend to the surface where convenient access may always be had in order to maintain and insure tight seal conditions at all times. It will be clear that the structure of a similar seal ring 25 located at the other end of the casing 12, is substantially identical to that described in connection with ring 16.

At at least one location along the casing 12, between the seal rings 16 and 25, there is provided a vent tube 28 which extends from within the casing 12 upward until it reaches above the surface of the ground. This vent tube 28 is securely attached to the casing 12 where it passes through the wall thereof, in any convenient manner, e.g. by welding or the like, in order to maintain a liquid-tight space within the casing 12. At the upper free end of tube 28 there is provided a protective cap 29, for keeping rainwater or any extraneous materials from entering the tube. As illustrated, there may be provided a similar vent tube 30 at the other end of the casing 12. But, so long as the space between seal rings 16 and 25 is unobstructed, a single vent tube would probably be adequate. The purpose of vent tubes 28 and 30 is merely that of providing means for escape of any gases which might be introduced into the annular space within casing 12, e.g. by means of leakage from the pipe 13.

Referring to FIGS. 3 and 4, it is pointed out that there is illustrated a different embodiment for the structure of seal rings that are to be employed with the casing and pipeline 12 and 13, illustrated in FIG. 1. This modification involves the use of a plurality of ribs 34 and 35 on the inner and outer surfaces respectively of a hollow inflatable torous ring 36 that is similar to the ring 16. It will be observed that the ribs 34 extend longitudinally around the inner surface of the ring 36, so that they will come in contact with the outside surface of the pipe 13 when in place therearound. Similarly, the outer ribs 35 extend longitudinally around the outermost exterior surface of ring 36 such that they will come in contact with the inside surface of the casing 12 near one end thereof.

It will be noted that an inflation tube 37 is connected to a side wall of the ring 36. This tube 37 will extend from ring 36 upward to the surface above the casing in a similar manner as tube 18 of ring 16. In the present case, tube 37 most conveniently may extend up beginning with a curve starting substantially in a horizontal direction and bending ninety degrees to extend vertically thereafter. Consequently, no provision for a hole through the casing 12 need be made in this instance, since the tube 37 will thus extend out axially until past the end of the casing 12 before proceeding upward through the adjacent formation to the surface.

Referring to FIG. 5, it will be observed that there is a seal ring 40, which is only different from the ring 16 by reason of its having a split-ring-type construction. Thus, there is provided at the dividing surface where the ring 40 is split, an end wall 41 across one extremity, and another end wall 42 similarly extending across the other extremity of the split tube 40. In order to aid maintenance of a proper seal, there may be also included an interlocking structure to hold end walls 41 and 42 in close contact with one another. Such interlocking structure is illustrated as including a tongue 43, integral with end wall 41, while there is provided a matching groove 44 integral with end wall 42.

FIG. 6 illustrates still another embodiment of a seal structure according to the invention. In this seal structure there is provided, integrally with a hollow torous ring 48, a plurality of radial support columns 49, 50 and 51. These columns 49, 50 and 51 extend transversely relative to the axis of the pipe 13, when seal ring 48 is in place therearound. These support spacers, or columns 49, 50 and 51, may take various forms so long as they accomplish the desired purpose of supporting and centrally spacing the pipe 13 within the casing 12.

In the illustrated embodiment of ring 48, it is contemplated that the column 49 may be molded as one complete unit, joining the inner and outer surfaces of ring 48 at the bottom portion thereof, when viewed as shown in FIG. 6. This is also the orientation that the ring 48 will have as it is to be located when in operative position with casing 12. Spacer columns 50 and 51 are to be located at the sides of the pipe 13, and include passages 52 and 53 respectively for connecting the hollow interior of the ring 48 with an inflation tube 54 that is connected thereto. It will be noted that there may be provided an arrangement such as detached surfaces 55, both at the radially inner and outer ends of columns 50 and 51. These wedges, or detached surfaces 55, are provided in order to insure an even expanding action of the outer surfaces of ring 48, when pressure is applied thereto. Such detached structure is unnecessary for column 49, since this column will bear the vertical weight load of pipe 13 thereon.

While certain embodiments of the invention have been described in considerable detail in accordance with the applicable statutes, this is not to be taken as in any way limiting the invention, but merely as being descriptive thereof.

It is claimed:

1. An inflatable seal bushing for sealing a pipeline casing comprising a hollow resilient means having an inflated configuration to match the inside surface of said casing and to contact the outside surface of the pipe of said pipeline, means for introducing a fluid into said hollow resilient means to inflate same, and a plurality of angularly disposed, relatively solid spacer means integral with said hollow resilient means and transverse thereto for centering and supporting said pipe within said casing, each of said spacer means having a passage therethrough for providing fluid communication in the hollow interior of said hollow resilient means.

2. Apparatus as defined in claim 1 wherein said spacer means are attached to said hollow resilient means along only a portion of the length of said spacer means providing a detached area at each end of said spacer means permitting expansion of said hollow resilient means relative to said ends of said spacer means.

3. An inflatable seal bushing for sealing a pipeline casing comprising a hollow ring of resilient material having an inflated configuration to match the inside surface of said casing and to contact the outside surface of the pipe of said pipeline, inlet valve means for introducing a fluid into said hollow ring to inflate same, a substantially rigid column member spaced from said inlet valve means integral with said ring and transversely extending thereto and adapted to bear the vertical weight load of said pipe, and a plurality of relatively solid spacer members integral with said ring and transverse thereto angularly spaced from said column member and having a passage therethrough for providing fluid communication in the hollow interior of said ring, said column member and said spacer members affording means for centering and supporting said pipe within said casing independent of fluid pressure within said ring.

4. An inflatable seal bushing for sealing a pipeline casing comprising a hollow ring of resilient material having an inflated configuration whereby the outer surface of said ring is in intimate contact with the inside surface of said casing and the inner surface of said ring is in intimate contact with the outside surface of the pipe of said pipeline, said ring being split to allow positioning thereof around the pipe by transverse movement relative to the axis of the pipe, opposed parallel solid end walls at said split in said ring and transverse to said ring to maintain the hollow interior of said ring fluid tight, an integral boss extending outwardly from the surface of one of said end walls, a recess complementary to said boss and extending inwardly into said second end wall for accommodating said boss, said boss and recess providing an interlocking assembly for said ring with said boss received within said complementary recess when said ring is positioned around said pipe, inlet valve means for introducing a fluid into said hollow ring to inflate same, and a plurality of relatively solid spacer members integral with said ring and transverse thereto having a passage therethrough for providing fluid communication in the hollow interior of said ring, said spacer members disposed angularly to each other and affording means for centering and supporting said pipe within said casing.

References Cited in the file of this patent

UNITED STATES PATENTS

| | | | |
|---|---|---|---|
| 216,286 | Miller | June 10, | 1879 |
| 539,568 | Bride | May 21, | 1895 |
| 1,030,587 | Jackson | June 25, | 1912 |
| 1,439,452 | Shaw | Dec. 19, | 1922 |
| 1,510,212 | Du Bois | Sept. 30, | 1924 |
| 1,854,855 | Nakashima | Apr. 19, | 1932 |
| 1,966,202 | Pfefferle | July 10, | 1934 |
| 2,299,734 | Betts | Oct. 27, | 1942 |
| 2,309,658 | Miller | Feb. 2, | 1943 |
| 2,648,554 | Gilbert | Aug. 11, | 1953 |
| 2,753,074 | Schmid | July 3, | 1956 |
| 2,816,575 | Stokes | Dec. 17, | 1957 |